(No Model.)

F. H. RICHARDS.
BUTTON SETTING MACHINE.

No. 381,031.   7 Sheets—Sheet 1.

Patented Apr. 10, 1888.

Witnesses:
Frank H. Pierpont
Wilbur M. Stone

Inventor:
Francis H. Richards (No Model.)  7 Sheets—Sheet 3.

F. H. RICHARDS.
BUTTON SETTING MACHINE.

No. 381,031. Patented Apr. 10, 1888.

Witnesses:
Frank H. Durkont
Wilbur M. Stone

Inventor:
Francis H. Richards (No Model.) 7 Sheets—Sheet 4.
F. H. RICHARDS.
BUTTON SETTING MACHINE.
No. 381,031. Patented Apr. 10, 1888.
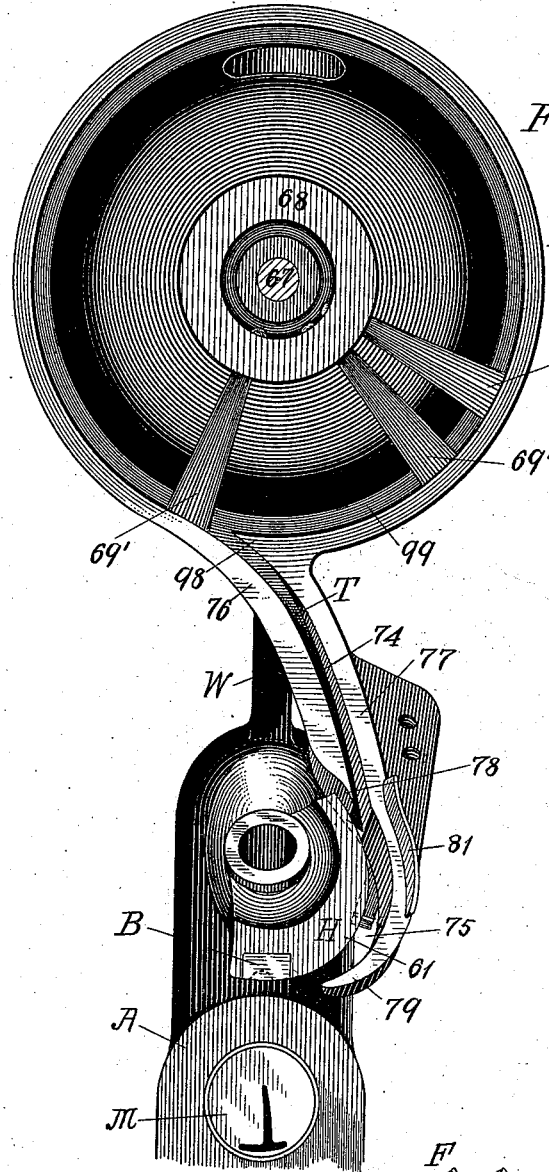
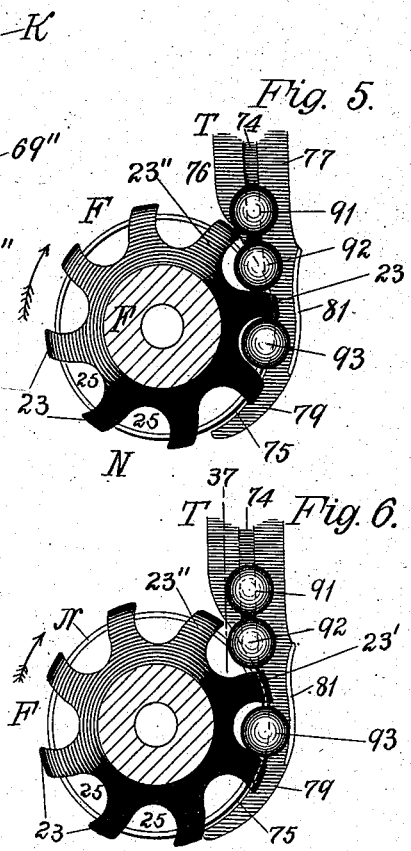
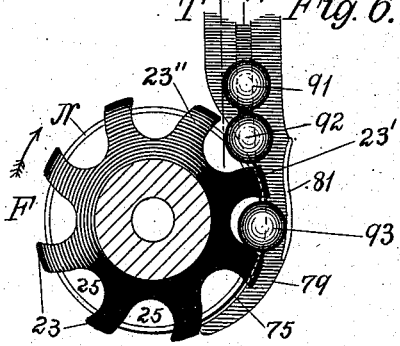
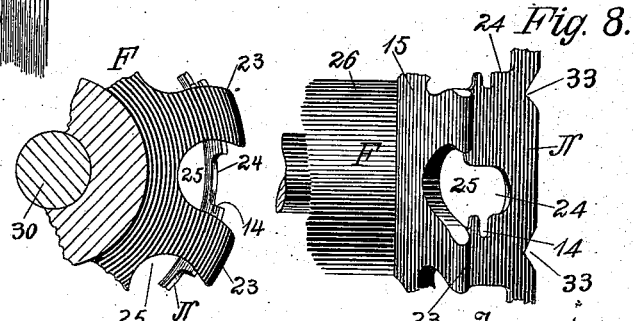
Witnesses:
Frank H. Pierpont
Wilbur M. Stone
Inventor:
Francis H. Richards (No Model.) 7 Sheets—Sheet 5.

F. H. RICHARDS.
BUTTON SETTING MACHINE.

No. 381,031. Patented Apr. 10, 1888.

Witnesses: Frank H. Pierpont, Wilbur M. Stone.

Inventor: Francis H. Richards

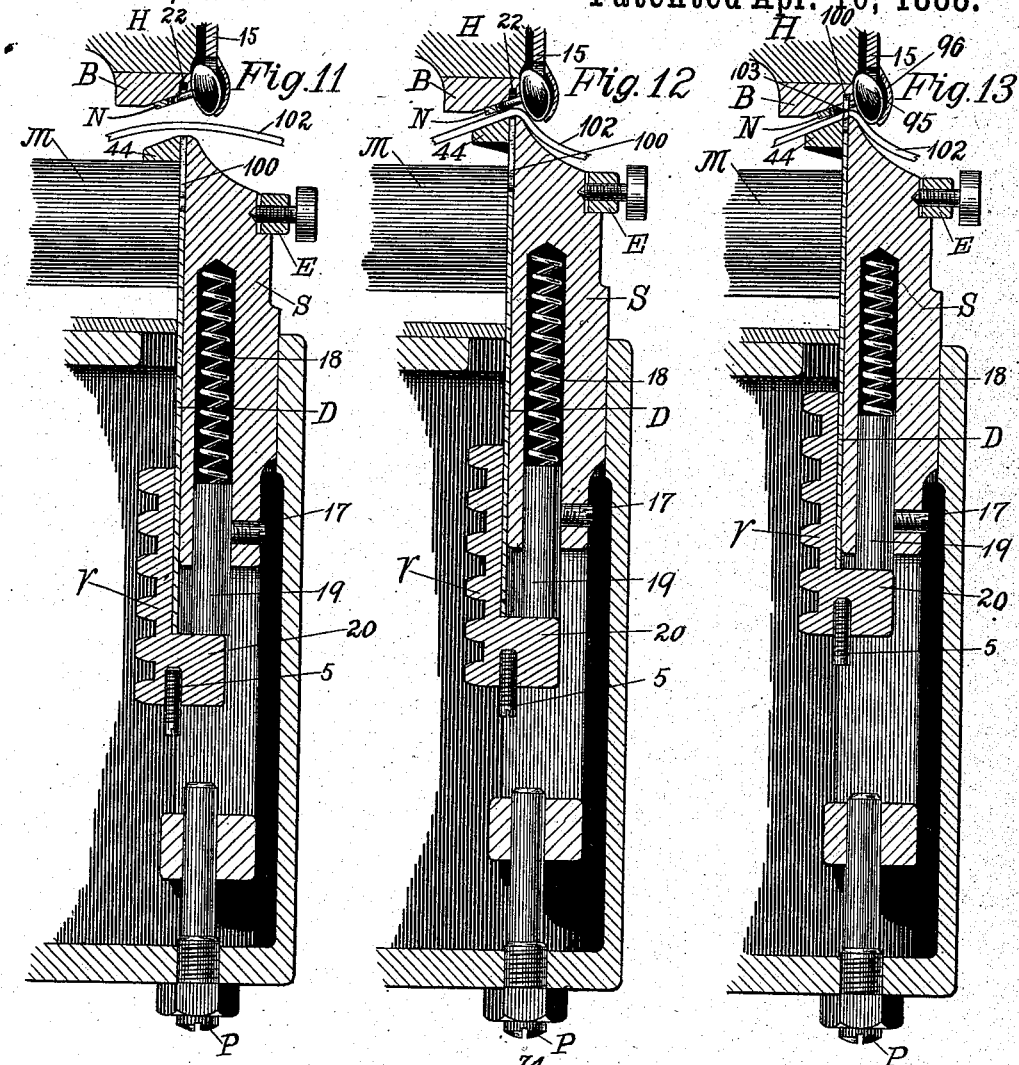

(No Model.)  7 Sheets—Sheet 7.
F. H. RICHARDS.
BUTTON SETTING MACHINE.
No. 381,031.  Patented Apr. 10, 1888.
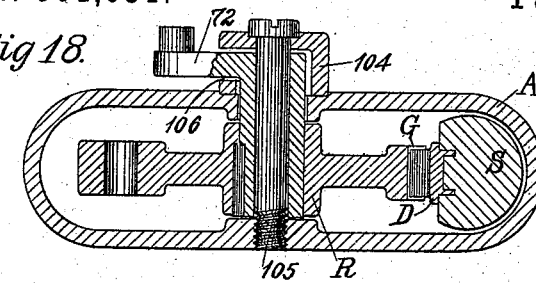
Fig. 18.
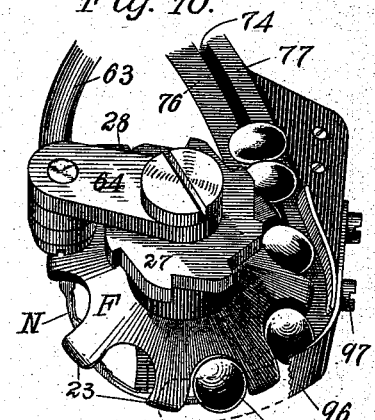
Fig. 16.
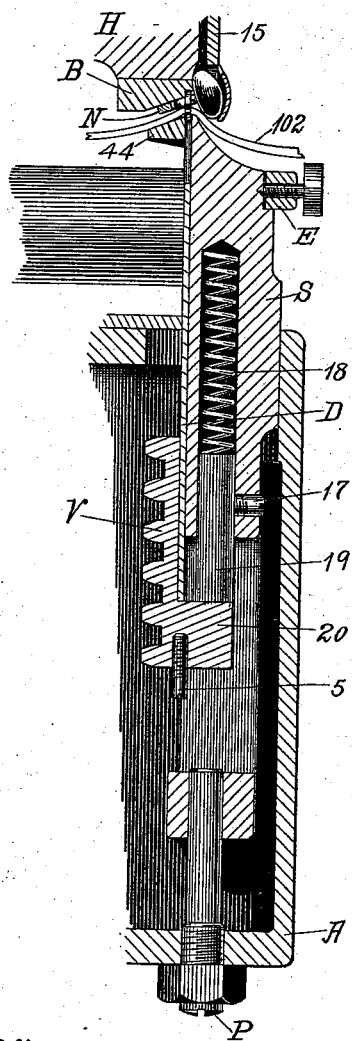
Fig. 14.
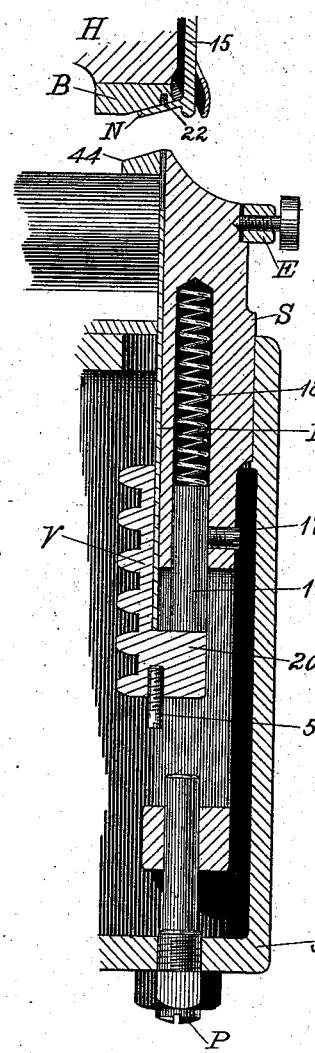
Fig. 15.
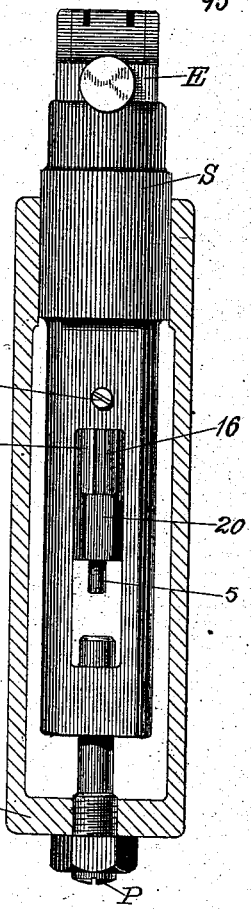
Witnesses:
Frank H. Pinkout
Wilbur M. Stone
Inventor:
Francis H. Richards

UNITED STATES PATENT OFFICE.

FRANCIS H. RICHARDS, OF HARTFORD, ASSIGNOR TO THE AMERICAN BUTTON FASTENER COMPANY, OF NEW BRITAIN, CONNECTICUT.

BUTTON-SETTING MACHINE.

SPECIFICATION forming part of Letters Patent No. 381,031, dated April 10, 1888.

Application filed September 6, 1887. Serial No. 248,982. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Button Setting Machines, of which the following is a specification.

This invention relates to machinery for attaching shank buttons to shoes or fabrics by means of malleable metallic fasteners.

The invention has for its object to furnish an improved machine of that class provided with improved button-feeding mechanism for presenting buttons to the fastener-setting mechanism.

For the attainment of this object the invention consists in certain improvements on the button-setting machine described in Letters Patent of the United States No. 311,033, granted to me January 20, 1885, and in the combinations hereinafter more fully set forth.

Figure 1:
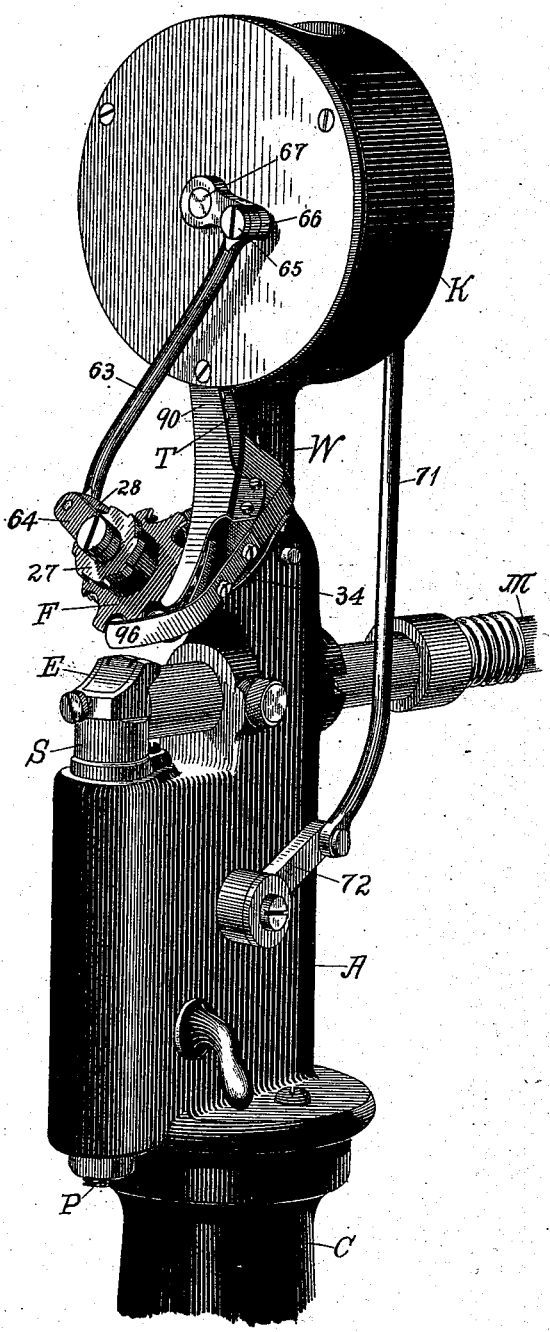
Figure 2:
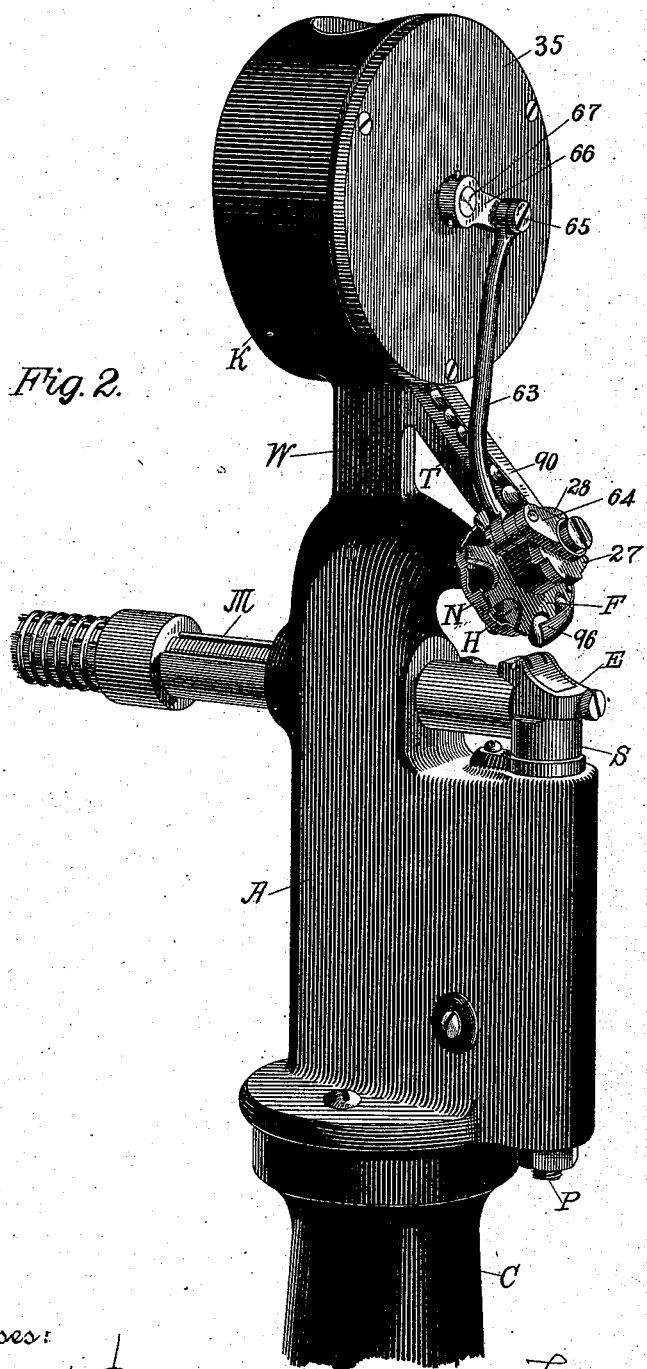
Figure 3:
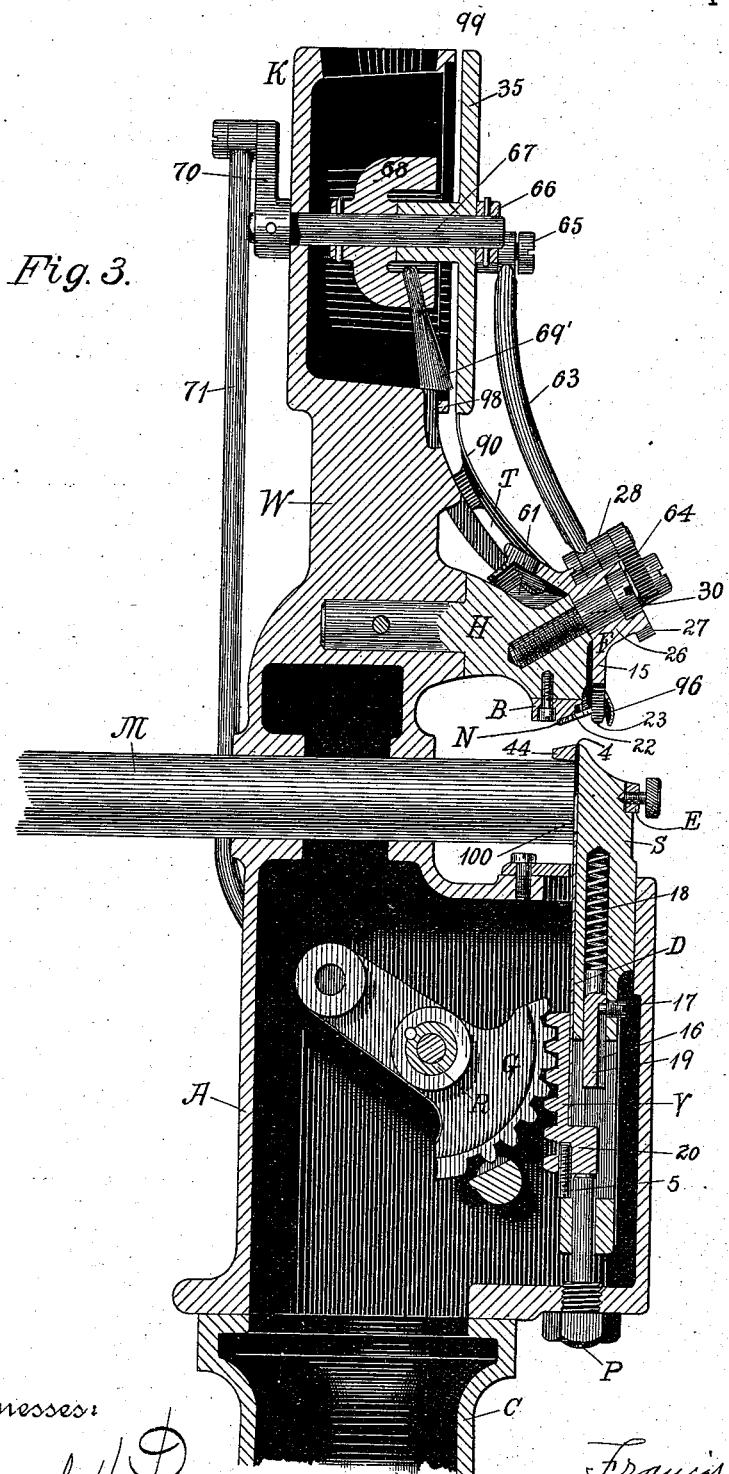
Figure 9:
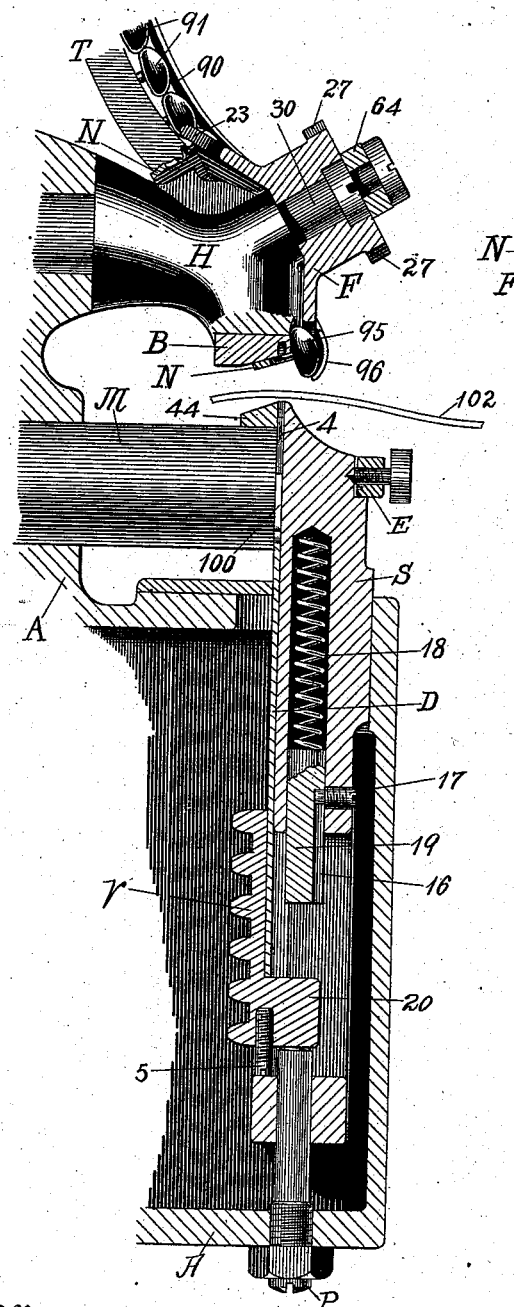
Figure 10:
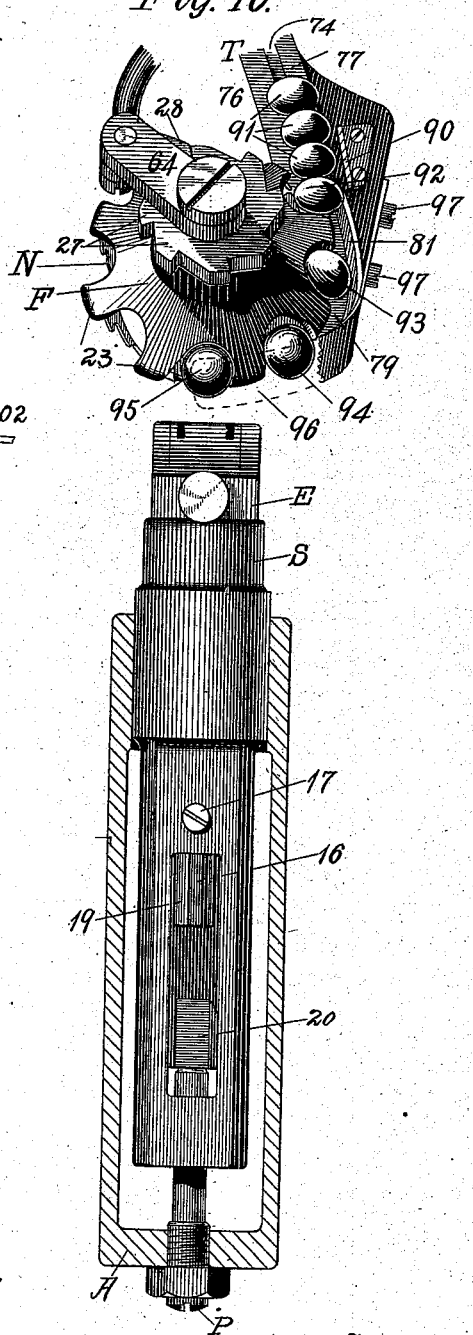

In the drawings accompanying and forming a part of this specification, Figure 1 is a perspective view of a button-setting machine embodying my improvements, the view being taken from a point at the front and right hand of the machine. Fig. 2 is a similar view taken from a point at the front and left hand of the machine. Fig. 3 is a vertical sectional elevation of the entire machine. Fig. 4 is a front elevation of the button-reservoir and certain other details of the machine. Figs. 5 and 6 are views illustrating the operation of the button-carrier or feed-wheel. Fig. 7 is an enlarged front view, and Fig. 8 a similar side view, of a portion of the feed-wheel in a preferred form. Fig. 9 is a vertical section similar to a portion of Fig. 3, showing the driver, presser-slide, and feed-wheel in position ready for operation. Fig. 10 is a front elevation of the parts shown in Fig. 9, the feed-wheel being supplied with buttons and some details partially broken away. Figs. 11, 12, 13, 14, and 15 are views similar to Fig. 9, showing succeeding stages of the operation of setting a fastener, the first and last stage being shown in Fig. 9. Fig. 16 is a front elevation of the parts as shown in Fig. 15. Fig. 17 is a view illustrating, in connection with Figs. 10 and 16, the operation of the button-carrier. Fig. 18 is a horizontal section through the frame of the machine at about the height of the rock-shaft R and through the presser-slide and driver.

Similar characters designate like parts in all the figures.

The frame of the machine (designated in a general way by A) consists, or may consist of a hollow casting, substantially as shown, adapted to be supported on a column, C, or otherwise, and to carry the several parts of the respective mechanisms. Said frame has bearings for a vertical presser-slide, S, for the magazine M and for the rock-shaft R. It is also constructed to rigidly hold the frame H of the button-feeding apparatus, which frame serves also as a head to carry the die-block B; or the concave setting-die may be formed in the head H, if this is made of proper material. The presser-slide S is grooved on its rear face to receive the driver D, which is supposed to be the same as the driver described in my aforesaid patent. The upper end of said slide is formed to receive the cap E, whose back cross-bar, 44, forms the rearward wall of the driver-channel 4, as more fully described in my application Serial No. 243,630. Said slide has its lower bearing on the stud P fixed in the frame A, and may be depressed by the driver D, which is provided for that purpose with some suitable stop, as 5. This stop, as shown in the drawings, consists of a screw adjustably fixed in the lower end of the driver. The stud P serves as a stop for the driver, it being adjustably secured in the frame A, (see Fig. 3,) for the purpose of adjusting the downward stroke of said driver.

The driver D is formed at its upper end to pass through the usual driver-channel, as 4, and may be operated by any suitable means, as the teeth of gear G engaging with the teeth of rack V, which is fixed on the driver. Said driver, or the rack V thereof, is shaped at its lower end, as at 20, to strike and rest on stud P as a stop therefor. Power is or may be applied to the oscillating segment G through a connecting-rod from the ordinary treadle mechanism, as described in my aforesaid Patent No. 311,033.

The presser-slide S is moved up by the driver acting through some spring suitably arranged therefor. A preferred construction and arrangement of this feature is as follows: The slide is formed hollow to receive the push-spring 18 and the sliding plug 19, and has a stop-screw, 17, whose point stands in a groove, 16, formed in said plug 19. On the upward movement of the driver its projecting part 20 strikes the lower end of plug 19, which pushes up on spring 18, and thus lifts the slide S up against the button-carrier or against the fabric or material laid thereunder. In practice these several parts should be so proportioned and adjusted that the driver carries a fastener about to the top of the driver-channel before the slide is lifted.

Fixed in or to the upper part of the frame A there is a head or bracket, H, to the under side of which the die-block B is attached in the usual manner, and which is provided with a stud, 30, for carrying the feed-wheel. This die-block has formed therein the usual concave setting-die, 22, whose position is immediately over the driver-channel 4.

For presenting the buttons to the setting-die in proper position to be attached to the fabric I employ a revolving carrier or feed wheel, F, which is an improvement described and claimed in United States Patent No. 319,507, granted to me June 9, 1885. This carrier consists or may consist of a disk, 15, (formed either conical, as shown, or flat,) provided with teeth 23, and having a hub, 26, provided with a ratchet, 27. Said disks serve also as a stop-plate to prevent the buttons being pushed up too far by the fabric on the presser-slide during the operation of the machine. Upon the rearward face of carrier F there is a flange or guide, N, which lies close to and extends under the lower side of the die B. In this flange or rim there are formed suitable spaces, openings, or pockets, as 24, for receiving the shanks of buttons whose heads lie in the pockets 25, that are formed in disk 15 between the teeth 23, which teeth in the preferred form of wheel F extend outside of rim N. Said shank-receiving spaces or cavities 24 serve the purpose of the cavity of similar outline which in my aforesaid application No. 243,630 is shown formed in the setting-die itself. By this means the button-shanks are carried to position under and away from the setting-die in a very regular and certain manner. At one side of space 24 there is a lateral cut or slot, 14, through which the fastener-point passes after it turns downward during the setting operation.

Without the cut 14 it would be necessary for the opening 24 to be wider on that side. This is found objectionable, because taking away to some extent the guide for the button shank or eye, and also because such enlargement would allow the leather or fabric to be pushed up therein, so the point of the fastener could re-enter the same. On its rear edge the rim N has some suitable detent-notches, as 33, formed therein, and an ordinary detent-spring, 34, Fig. 1, is constructed and arranged to bear in said notches for properly holding the wheel F in place during the fastener-setting operation.

The button-reservoir K is supported on a bracket, W, on the main frame and has the usual front plate, 35, suitably secured thereto by screws. (Not fully shown.) The reservoir is provided with an ordinary button-chute, T, leading therefrom, and within has the usual means (as the oscillating brush 68, provided with bunches of bristles 69' 69", or other device for like purposes) for directing the buttons into said chute. This device may be carried or actuated by an oscillating shaft, 67, extending through the reservoir, and having suitably affixed thereon an arm, 70, connected by a rod, 71, to the arm 72 of the aforesaid rock-shaft R. By means of this or other ordinary arrangement of connections the brush has or may have imparted thereto a rotary reciprocating movement corresponding to the vertically-reciprocating movement of the driver D.

For the purpose of actuating the feed-wheel F the following preferred arrangement of connections may be employed: The shaft 67 has affixed on the front end thereof an arm, 66, provided with a crank or pin, 65. The feed-wheel has thereon suitable ratchet-notches, as 27, and the arm 64, pivotally supported in front of said wheel, carries the pawl 28, which engages with said notches. A connecting-rod, 63, is operated from arm 66 and operates arm 64. By this means the rotary reciprocating movement of shaft 67 imparts an intermittent rotary movement to the feed-wheel.

The button-chute T (having the usual groove, 74) leads downward and laterally (unless the reservoir be located otherwise than as shown) and terminates adjacent to the setting-die in a curved part, 75, conforming to the button-carrier described above. In Fig. 4 this arrangement is the more clearly shown. The groove 74 is a channel formed between the two ribs or sides 76 77 of the chute T. The rib 76 terminates adjacent to the upper part of frame H, leaving space enough at 78 for the passage therein of the rim N of the button-carrier F. The inner wall of space or channel 75 is formed by the curved button-guiding edge 61 of the part H. The rib 77 extends farther downward and terminates in a curved guide or button-guiding finger, 79, which forms the outer wall of the curved space 75, which space should in practice, and as shown in Fig. 4, be wider than groove 74, so that a button-shank may lie therein outside of the rim N. This arrangement is found to give the best results and ordinarily avoids the clogging of the feed-wheel by slightly-imperfect buttons. Usually a short guard, 81, is formed on rib 77 at the point where the buttons are entering the feed-wheel, for the purpose of steadying the buttons and to assist in properly guiding their shanks into spaces 24. A suitable guard or chute cover, as 90, is provided and properly arranged for holding the buttons 91 92 93 from being thrown out of the chute.

Before arriving at position 95 in readiness for attaching to a fabric, the buttons are carried by the feed-wheel under a spring-guide, 96, which I ordinarily attach to the machine by screws 97. This guide serves to retain the buttons in the feed-wheel at 94 and bears firmly on the button at 95. The particular manner in which such bearing should be made is well shown in Figs. 9, 11, 12, 13, and 14. The end of spring 96 is here shown concaved and arranged to bear backward and upward on the head of button 95 below the center thereof, thereby holding the head up into pocket 25 and the shank firmly up into space 24 and against the under side of the setting-die B.

The operation of the feed-wheel as it engages the buttons in chute T is best shown in Figs. 5 and 6. The latter figure shows the position of said wheel during the operation of setting a button-fastener when the button 92 lies on the upper edge of tooth 23' and button 91 lies on button 92. The wheel F being now turned forward in the direction of the arrow, tooth 23" comes under button 91 and drives button 92 downward in groove 74 to position 93, and the said parts, as here described, are so combined and arranged that if this forward movement of wheel F shall be instantaneous, so that buttons 91 and 92 do not follow the downward movement of tooth 23', the tooth 23" will still seize and carry down the button 92. This construction has a peculiar utility in my present machine, inasmuch as this is designed to be operated by foot-power, and the movement of wheel F is frequently so sudden that gravity cannot move down the buttons nearly so rapidly as the movement of teeth 23, and said construction is such that a line, 37, Fig. 6, drawn tangent to buttons 91 92, will pass the point of tooth 23", so that, the wheel F having been moved instantly, the button 91 may pass by said tooth and reach position 92 while the wheel is at rest; but it should be understood that this feature here particularly described is not a necessary feature of all combinations embracing the chute and feed-wheel.

The button-chute groove 74, as will be seen in Fig. 4, leads out of the reservoir K at an angle, the wedge 98 lying between said groove and the circumferential channel 99. By this arrangement the brush 69' is the feeding-brush and 69" are the retracting-brushes. It will be observed, also, that the arrangement of operating-shafts and connections is such (arm 66 extending toward the right hand from shaft 67 and arm 64 toward the left hand from the feed-wheel axis) that the button-feeding brush 69' is timed to move forward (that is, toward the wedge 98) during the forward movement of the feed-wheel. This construction is for the purpose of obtaining a maximum efficiency of the button-feeding apparatus. Suppose, for instance, that at a given moment, the machine being at rest, the chute is full of buttons, with the exception of two button-spaces at the upper end thereof. If, now, the feed-wheel remains at rest while the brush makes its forward or feeding-stroke, it is evident that only two buttons can enter the groove 74; but if the feed-wheel moves forward simultaneously with said brush-stroke toward wedge 98, then as many as three buttons may enter said groove 74 during one movement of the machine. This important advantage is secured, as above noted, by means of the combination, in the machine and with said wheel and brush, of the means for actuating these parts.

The preferred arrangement of shaft R is shown in Fig. 18. The frame A being properly bored to receive cap 104, this cap is held in place by a screw, 105. This screw serves as a bearing for the hollow rock-shaft R, which is fixed rigidly in lever G. The arm 72 of said shaft R reaches out through an opening, 106, to connect with rod 71, as shown in Fig. 1. Usually I make the shaft R and its arm 72 integral.

The operation of the machine to set buttons is as follows: The magazine M and reservoir K being properly supplied and buttons fed down in the chute to the setting-die, the lever G is operated by the usual rod (not shown) to force up the driver D from the position in Fig. 9 to the position in Fig. 11. The fastener 100 is thus driven up into the upper part of the driver-channel. Continuing the upward movement of the driver, the lug 20 thereof, acting through plug 19, compresses spring 18 and (during the latter part of the upward stroke of the driver) carries up the presser-slide against the fabric 102, (previously placed under the feed-wheel and die,) as in Fig. 12, and afterward drives up and sets the fastener, as in Fig. 13, with the fastener-prong formed into a hook through the shank 103 of button 95. On now lowering the driver, as in Fig. 14, the plug 19 is thrown down until stopped by screw 17, after which (during the latter part of the downward stroke of the driver) the slide goes down, as in Figs. 15 and 16, while the driver itself moves farther down to its original position in Fig. 9. During the upward stroke of the driver the connections described move arm 64 from its position in Fig. 10 to that in Fig. 17, and on lowering the driver said arm is carried back, thereby turning forward the feed-wheel and feeding button 94 to position 95. The stroke of arm 64 is made greater than required to turn wheel F through one division, so that the movement of said wheel shall begin, approximately, when the slide S begins to move down from the setting-die. This causes the fabric 100 to be released before it is carried forward by the buttons last attached thereto. The rim N of wheel F is by that means permitted to readily drag the fastener-prong out of the die, which otherwise it could not easily do.

This improved button-setting machine is, and especially the several details thereof are, capable of modification in construction and arrangements in various ways and degrees other than the ways described, after the manner of machines in general, and within the scope and limits of my invention.

Having thus described my invention, I claim—

1. In a button-setting machine, a setting-die, in combination with a button-carrier in front of and extending under said die, said carrier having a button-receiving pocket extending into the part thereof under said die, and through which the button-fastener prong can have access to said die, substantially as described.

2. In a button-setting machine, a setting-die, in combination with a rotary button-carrier in front of and extending under said die, said carrier having a series of button-receiving pockets extending into the part thereof under said die, and through which the fastener-prongs can have access to said die, substantially as described.

3. The combination, in a button-setting machine, of a setting-die, a rotary carrier in front of and having a rim extending under said die, and having one or more button-receiving pockets, and the button-chute leading to said die, said chute terminating in a channel for the passage of said rim and the button-shanks, substantially as described.

4. The combination of the stationary setting-die and the wheel F, having the rim N extending under said die, said wheel having the button-head-receiving pockets 25, and said rim having the corresponding button-shank-receiving openings 24, through which the button-fastener prong has access to said die, substantially as described.

5. The feed-wheel F, consisting of a disk or plate, 15, and the rim N at one side of said plate, the whole having the button-receiving pockets, all substantially as described.

6. The feed-wheel F, consisting of a disk or plate, 15, having the pockets 25, the rim N at one side of said plate and having the openings 24, and the cut or slot 14, extending laterally from said openings 24, substantially as described.

7. The feed-wheel F, consisting of a disk or plate, 15, having the pockets 25, and the rim N at one side of said plate and having the openings 24, the plate 15 between said pockets 25 forming teeth that extend outside of rim N, substantially as shown and described.

8. The combination of the frame H, having the rounded edge 61 and provided with a setting-die, the feed-wheel carried on said frame and having a part extending under said die, and the finger 79, forming the outer wall of the space or channel 75, all substantially as described.

9. The combination and arrangement, with the fixed setting-die and the button-chute T, leading to said die, of the intermittingly-moving feed-wheel F, having teeth 23, spaced as described, so that when the feed-wheel is at rest holding one button at the setting-die another button may, in sliding down the chute, pass the point of tooth 23″ and rest on tooth 23′, all substantially as shown and described.

10. The combination, in the button-feeding mechanism of a machine, of the button-reservoir, a rotary reciprocating button-feeding brush in said reservoir, an intermittingly-rotating feed-wheel, and the button-chute leading from said reservoir to said feed-wheel, said brush and wheel being timed and coacting to move forward simultaneously, all substantially as described.

11. The combination, in the button-feeding mechanism of a machine, of the button-reservoir, a rotary reciprocating button-feeding brush in said reservoir, a feed-wheel, a button-chute leading from said reservoir to said feed-wheel, an arm operatively connected to feed said wheel, and a second arm connected to be operated from said brush, said arms being arranged in opposite directions from the feed-wheel axis and the brush-shaft, respectively, and connected together to be operated simultaneously, all substantially as described.

12. The combination, with the setting-die and with the feed-wheel having a rim extending under said die, said wheel having button-receiving pockets, substantially as described, of the spring-guide arranged in front of said wheel and operating to hold the button with its shank in the opening in said rim and against said die, all substantially as described.

13. The combination, with the setting-die and with the feed-wheel having a rim extending under said die, and having button-receiving pockets, substantially as described, of the button-guiding edge 61 within said wheel, the button-guiding finger 79 outside of said wheel, and the button-chute leading to said wheel and terminating in the channel between said edge 61 and finger 79, substantially as described.

14. The combination, with the setting-die and with the feed-wheel having a rim extending under said die, and having button-receiving pockets, substantially as described, of the button-guiding edge 61 within said wheel, the button-guiding finger 79 outside of said wheel and forming the outer wall of the channel 75, and the spring-guide arranged to serve as a cover for said channel and operating to hold a button in the pocket of said wheel and with its shank against said die, all substantially as described.

15. The combination, with the setting-die and with the feed-wheel having a rim extending under said die, and having button-receiving pockets, substantially as described, of the movable presser-slide under said rim, said slide having a driver-channel in alignment with said die, and through which the fastener can be driven up through the fabric and through the pocket in said rim into said die, all substantially as described.

16. The combination, with the setting-die and with the button-carrier having a rim extending under said die, and having button-receiving pockets, substantially as described, of the movable presser-slide under said rim, said slide having a driver-channel in alignment with said die, and the reciprocating driver in said channel, operating to drive the fastener-prong through the fabric and the pocket in said rim into said die, all substantially as described.

17. The combination, in a button-setting machine, of the movable presser-slide, the reciprocating driver, a yielding plunger, as 19, carried on said slide, and a stop limiting the downward stroke of, and a spring acting downward on, said plunger, all arranged and operating substantially as described.

18. The combination, in a machine of the class specified, of the stationary setting-die, a rotary button-carrier having a rim extending under said die, and having button-receiving pockets, substantially as described, the movable presser-slide under said rim and die, having a driver-channel in alignment with said die, the reciprocating driver in said channel, means (substantially such as described) operating said slide from the driver during the latter part of the stroke of the driver, and connecting mechanism operating the driver and carrier, whereby said carrier is moved forward during the downward stroke of said slide, all substantially as described.

FRANCIS H. RICHARDS.

Witnesses:
ELEAZER KEMPSHALL,
GROSVENOR W. CURTISS.